United States Patent [19]

Etlin

[11] 4,211,657

[45] Jul. 8, 1980

[54] MEANS FOR BIOLOGICAL TREATMENT OF WATER

[76] Inventor: Vladimir N. Etlin, 7403 Lisle Ave., Falls Church, Va. 22043

[21] Appl. No.: 891,261

[22] Filed: Mar. 29, 1978

Related U.S. Application Data

[63] Continuation of Ser. No. 768,993, Feb. 16, 1977, abandoned.

[51] Int. Cl.$^2$ .............................................. C02F 3/20
[52] U.S. Cl. .................................. 210/195.4; 210/220
[58] Field of Search ......... 210/195.3, 14, 15, 219–221, 210/253, 259, 195.1, 195.4

[56] References Cited

U.S. PATENT DOCUMENTS

| | | | |
|---|---|---|---|
| 2,574,685 | 11/1951 | Baxter et al. | 210/220 |
| 3,058,908 | 10/1962 | Morgan | 210/220 |
| 3,246,762 | 4/1966 | Sontheimer et al. | 210/195 S |
| 3,339,741 | 9/1967 | Bernard et al. | 210/195 S |
| 3,355,023 | 11/1967 | Foster | 210/195 S |
| 3,464,559 | 9/1969 | Bernard | 210/195 S |
| 3,834,540 | 9/1974 | Bernard | 210/195 S |
| 4,059,524 | 11/1977 | Chataigner et al. | 210/220 |

FOREIGN PATENT DOCUMENTS 2533520  2/1977  Fed. Rep. of Germany ....... 210/195 S

*Primary Examiner*—Benoit Castel

[57] ABSTRACT

An improved means for biological treatment of sewage characterized in the provision of a single aerating device feeding waste water serially into first and second settling chambers. The aerating chamber has a horizontal sectional area which generally increases in size from a relatively smaller horizontal sectional area at the bottom of a relatively larger horizontal sectional area at the top. The aeration chamber is characterized in the introduction of relatively large air bubbles within the water being aerated. The larger bubbles tend to move more quickly to the surface of the liquid being aerated, thereby increasing normal water movement and achieving more rapid oxidation. Plural settling chambers are connected by passageways to the aeration chamber, and an aerator in the aeration chamber causes recirculation of activated sludge from both chambers through the passageways, thereby treating in succession and maintaining sludge loss in the effluent at a minimum.

2 Claims, 6 Drawing Figures

MEANS FOR BIOLOGICAL TREATMENT OF WATER

This is a continuation of application Ser. No. 768,993, filed Feb. 16, 1977, now abandoned.

BRIEF DISCUSSION OF THE PRIOR ART

This invention relates generally to apparati and processes for biological waste water treatment. It is known in the art to subject liquid and solid wastes to exposure of activated sludge in the presence of oxygen, whereby bacteria present in the sludge feed on the liquid and solid wastes, following which the treated waste is discharged into a river or other large body of water.

Previously, these apparatus and processes have required the use of pumps to circulate waste water and have had relatively inefficient aeration chambers.

It is therefore an object of the present invention to provide a novel device for the biological treatment of waste water.

It is an additional object of the present invention to provide a device for the biological treatment of waste water in which an aerator causes circulation of waste water and sludge among various chambers without requiring any pumps.

A further object is to provide an aeration chamber which increases in cross-sectional area from the bottom to the top thereby greatly increasing turbulence in the waste water.

It is an object of the present invention to provide an apparatus of the class described offering a high degree of mixing ability for combining waste water and activated sludge in the aeration section thereof.

Another object of the present invention lies in the provision of an apparatus of the class described in which activated sludge upon settling in a settling section is returned to the aeration section with minimum head losses, and in a shorter period of time than heretofore possible in prior art devices.

Yet another object of the invention lies in the provision of improved treatment means of the class described which effects a high degree of waste and sludge mixing in the aeration section thereof with minimum power consumption.

Still another object of the invention lies in the provision of an improved means for sewage treatment offering, in addition to an aeration phase, two successive steps of sludge settling, while employing a single aerating means.

These objects, as well as other incidental ends and advantages, will more fully appear in the progress of the following disclosure, and be pointed out in the appended claims.

SUMMARY OF THE INVENTION

Briefly stated, the invention contemplates the provision of an improved waste water treatment device of the class described, consisting of an aerating chamber having outwardly sloping side walls, the chamber mounting an aerating means characterized by the ability to induct air by a moving impeller (as an example only), whereby relatively large bubbles are formed which tend to rise in the fluid being aerated at a very rapid rate, supplementing the normal mixing action of the impeller. The introduction of air with the formation of correspondingly large bubbles and the turbulence created by the outwardly sloping side walls of the aeration chamber materially accelerate the activity of the sludge and oxygen dissolution, enhancing the waste water treatment process at an accelerated rate with considerable efficiency. Aerated sewage is transferred to a first settling chamber of downwardly tapered configuration, wherein the activated sludge settles into a relatively narrow area to be returned to the aeration chamber, and the effluent flows to a second settling chamber of somewhat similar configuration, and disposed on a side opposite that of the first settling chamber, so that the single impeller can cause circulation of the sludge from both settling chambers.

BRIEF DESCRIPTIONS OF THE DRAWINGS

In the drawings, to which reference will be made in the specification, similar reference characters have been employed to designate corresponding parts throughout the several views.

DETAILED DESCRIPTION OF THE DISCLOSED EMBODIMENTS

Figure 1:
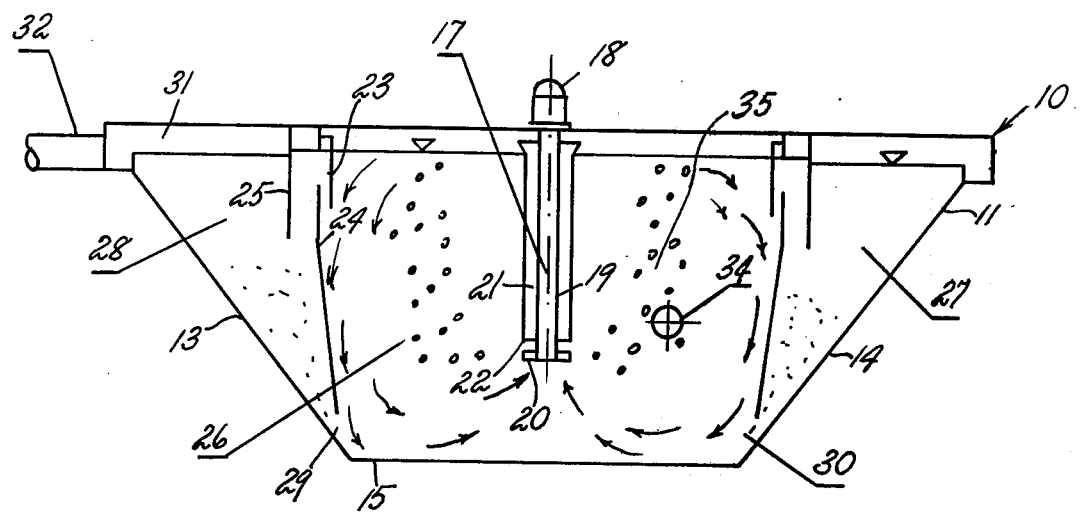
FIG. 1 is a schematic vertical sectional view showing a first embodiment of the invention.

In accordance with the first embodiment of the invention (FIGS. 1 and 2), the device, generally indicated by reference character 10 includes a housing element 11 of generally trapezoidal configuration. The housing element is bounded by a pair of side walls, one of which is indicated by reference character 12, end walls 13 and 14 and a bottom wall 15. A centrally positioned support (not shown) mounts an aerating element 17, which may be of a conventional type including a prime mover 18 and a rotating shaft 19 mounting an impeller 20. A concentric air passage 21 has a lower end 22 adjacent to the impeller 20, so that with rotation of the impeller, air is mixed into the treated water in a well known manner. First, second and third pairs of septums 23, 24 and 25, respectively, interconnect an aerating chamber 26 with a pair of settling chambers 27 and 28 of generally triangular cross section. The septums 24 slope outwardly, terminate above the end walls 13 and 14, and form lower ports at 29 and 30 whereby activated sludge (not shown) settles at the lower end of the chambers 27 and 28, and is recycled or inducted into the chamber 26 under action of the impeller 20.

An effluent trough 31 communicates with an effluent pipe 32 for discharge of treated water. Sewage inflow pipe 34 is positioned as shown in FIG. 1, at the lower part of the aeration chamber such that sewage will be immediately subjected to the action of air bubbles 35 formed by the impeller.

Sewage enters the aeration chamber, and moves upward, then flows through the passageway between septums 23 and 24 into the settling chambers from which it is discharged. Activated sludge settles in the settling chambers because of its density, and collects at the bottom, at the lower end of the septum 24, from where it is drawn back into the aeration chamber by suction produced by the circulating water.

Figure 2:
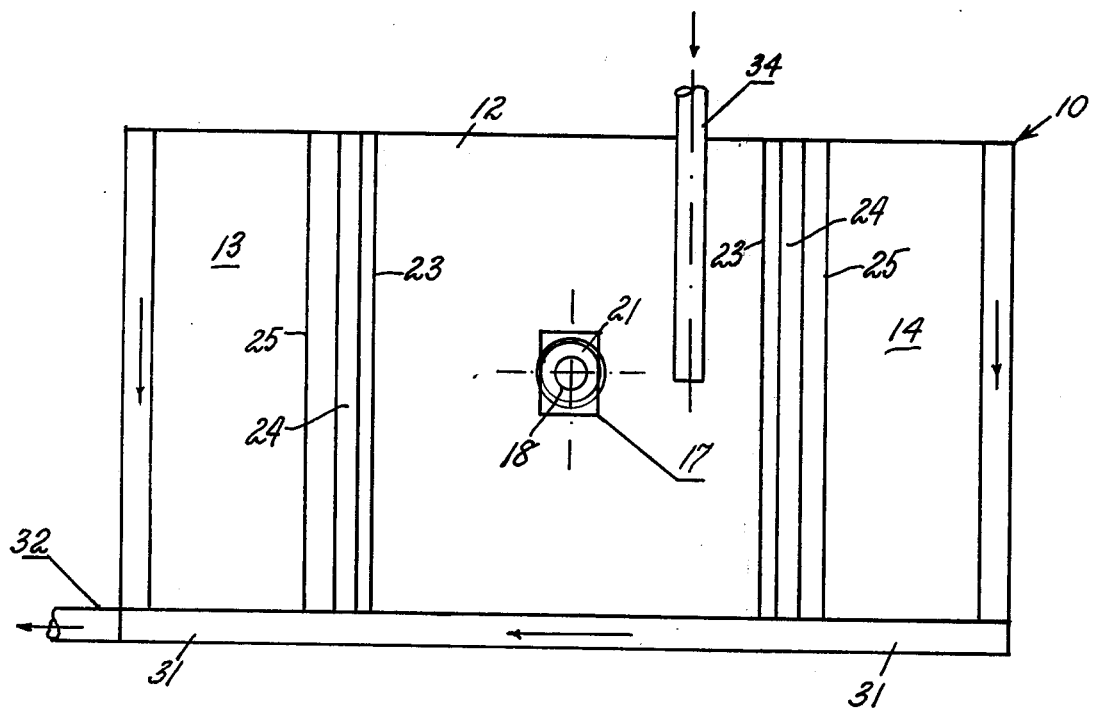
FIG. 2 is a schematic top plan view thereof.

Referring to FIG. 1, pressure at openings 29 and 30 is the same because the water is moving at the same velocity in those two areas, inasmuch as they are equidistant from the aerator. At any such area where such a port or conduit exists, the higher the velocity of the water, the lower the pressure at the opening and hence the greater the suction effect. Therefore if the aerator 117 is not symmetrically placed but is closer to the settling chamber 28, a greater water velocity will be produced in the area of opening 29 than at opening 30; therefore pressure at opening 29 will be lower than at 30 and consequently there will be greater suction effect at opening 29 than at opening 30. In this arrangement of the impeller, settling chambers will work in series (settling chamber 27 as first step and settling chamber 28 as second step). From a consideration of FIGS. 1 and 2, it will be apparent that only a single impeller is necessary to create the circulation which draws recycling sludge from both settling chambers which are working in parallel. If desired, air may be introduced into passage 21 under pressure, to result in a very large volume of air being mixed within the water being treated in the aeration chamber. While size of bubble is a relative matter, prior art thinking has been in the direction of producing bubbles in the aerating chamber as small as possible, with a view toward creating a large bubble surface in relation to the total amount of air mixed in the water being treated. However, larger bubbles provide other advantages: it has been empirically determined that when bubble size is relatively large, in the order of 30 to 80 mm. in diameter on formation, the bubbles tend to rise to the surface of the aeration chamber at a much more rapid rate than smaller bubbles, increasing the intensity of turbulence, thus exposing the surface of each bubble to more water, resulting in greater oxygen solubility. Furthermore, this greater turbulence causes a similar interaction with the activated sludge. Having the side walls of the aeration chamber slope outwards creates a cross-sectional area which increases toward the top of the aerating chamber, thereby producing greater turbulence in the waste water. The net result is increased capacity of one aeration chamber to treat sewage, coupled with a lower requirement for power which must be delivered by the impeller, to make the net result more economical.

Turning now to the second embodiment of the invention, generally indicated by reference character 40, parts corresponding to those of the first embodiment have been designated by similar reference characters with the additional prefix "1".

The second embodiment differs from the first embodiment in the modification of one of the two settling chambers, such that they are connected in series rather than in parallel and yet use the same aerator for recycling sludge back into the aeration chamber from both settling chambers. This enables a major portion of the activated sludge to be removed in the first step settling chamber, and the remaining sludge to be removed in the second step chamber downstream, with resultant higher efficiency of sludge recovery.

Figure 3:
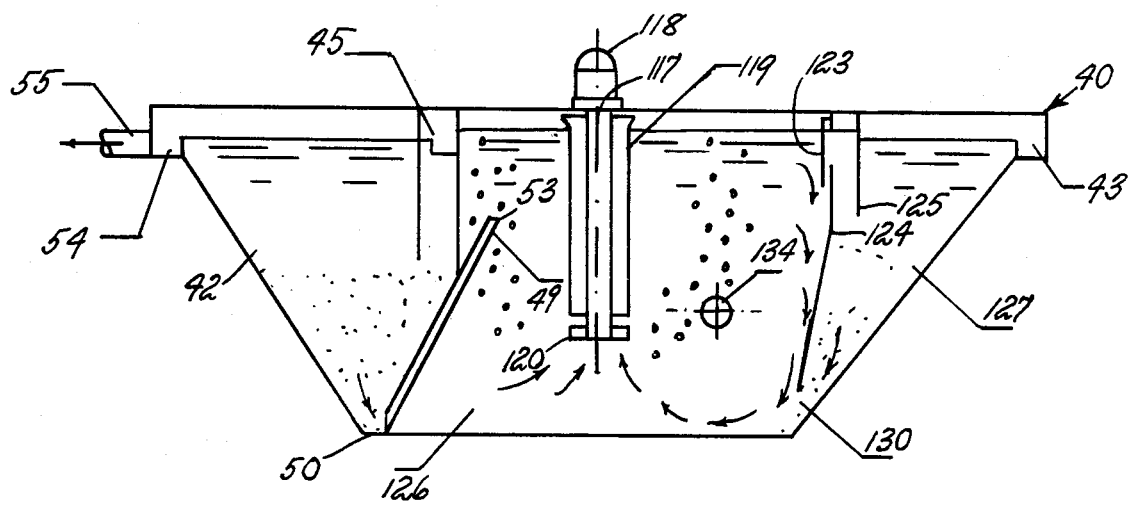
FIG. 3 is a schematic vertical section view showing a second embodiment of the invention.
Figure 4:
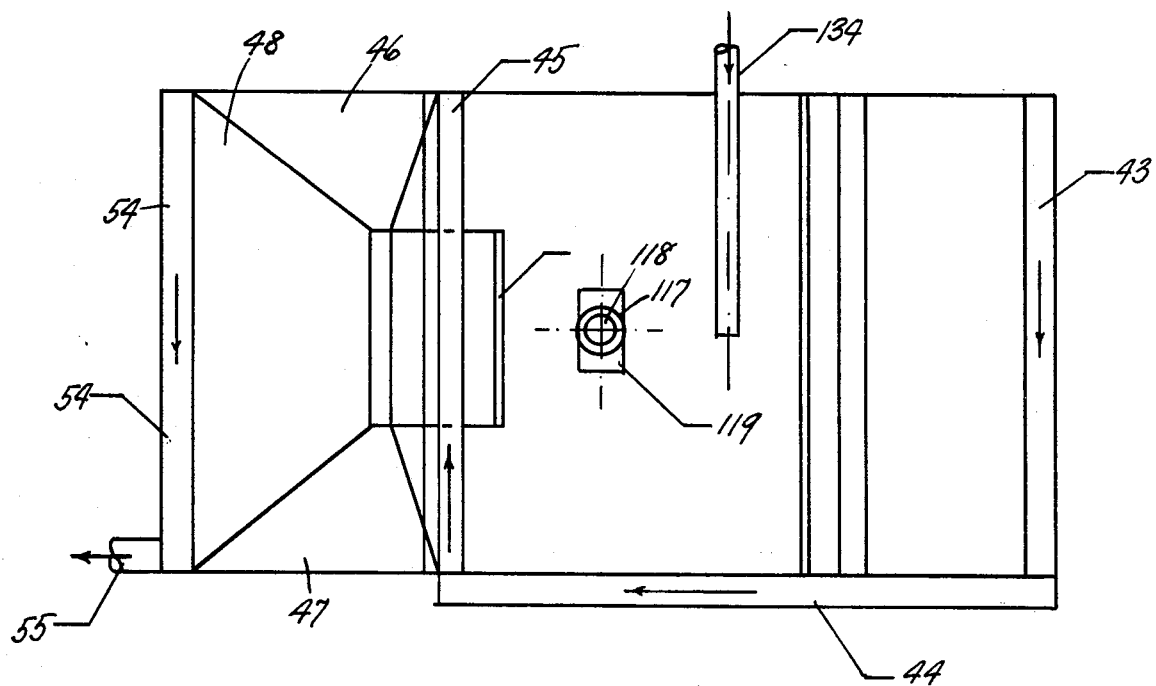
FIG. 4 is a schematic top plan view of the second embodiment.

As best seen in FIGS. 3 and 4, the second step settling chamber 42 is interconnected by conduit sections 43, 44 and 45 to the first step settling chamber 127. The chamber 42 is bounded by a pair of converging walls 46 and 47, an end wall 48, and a flat hollow conduit 49. The lower end 50 of the conduit 49 is positioned at the bottom of the second settling chamber 42, and terminates at a medial level or location 53 of the aerating chamber 126. Effluent from the chamber 42 flows through a trough 54 feeding an exit pipe 55.

During normal operation, the head in the aerating chamber 126 is higher than the head in the first settling chamber 127, and the head in the second settling chamber 42 is below that of the chamber 127. Thus, as water is introduced and aeration takes place, water first travels through the passageway between septum 123 and 124 to the first step settling chamber 127 which operates in a manner similar to that in the first embodiment. Then water flows through troughs 43, 44 and 45 to the second step settling chamber 42 where further settling occurs. Effluent from the chamber 42 flows at the top through a trough 54 feeding an exit pipe 55. The amount of sludge in the effluent from the chamber 42 is considerably less than that in the chamber 127. Because of the difference in liquid levels between the chamber 126 and the chamber 42, sludge can be moved back into the aeration chamber from the chamber 42 by creating at the point 53 a pressure differential greater than at the point 130. It is accomplished by the fact that two different phenomena are used: In the vicinity of point 130, pressure differential is produced by the circulation of water; while at point 53 pressure differential is produced by the motion of the bubbles rising to the surface. Point 130 is aspirated by the circulation of waste water in aeration chamber 126 and point 53 is aspirated by the rising air bubbles to produce a lower pressure at point 53 than point 130.

A single aerating device 117 for recirculating sludge from both settling chambers is used in this embodiment. The aerating device 117 can be either a mechanical aerator as shown in FIGS. 1, 2, 3, 4 and 5 or an air diffuser as in FIG. 6.

Turning now to the third embodiment of the invention, generally indicated by reference character 60, parts corresponding to those of the first and second embodiments have been designated by similar reference characters with the additional prefix "2".

Figure 5:
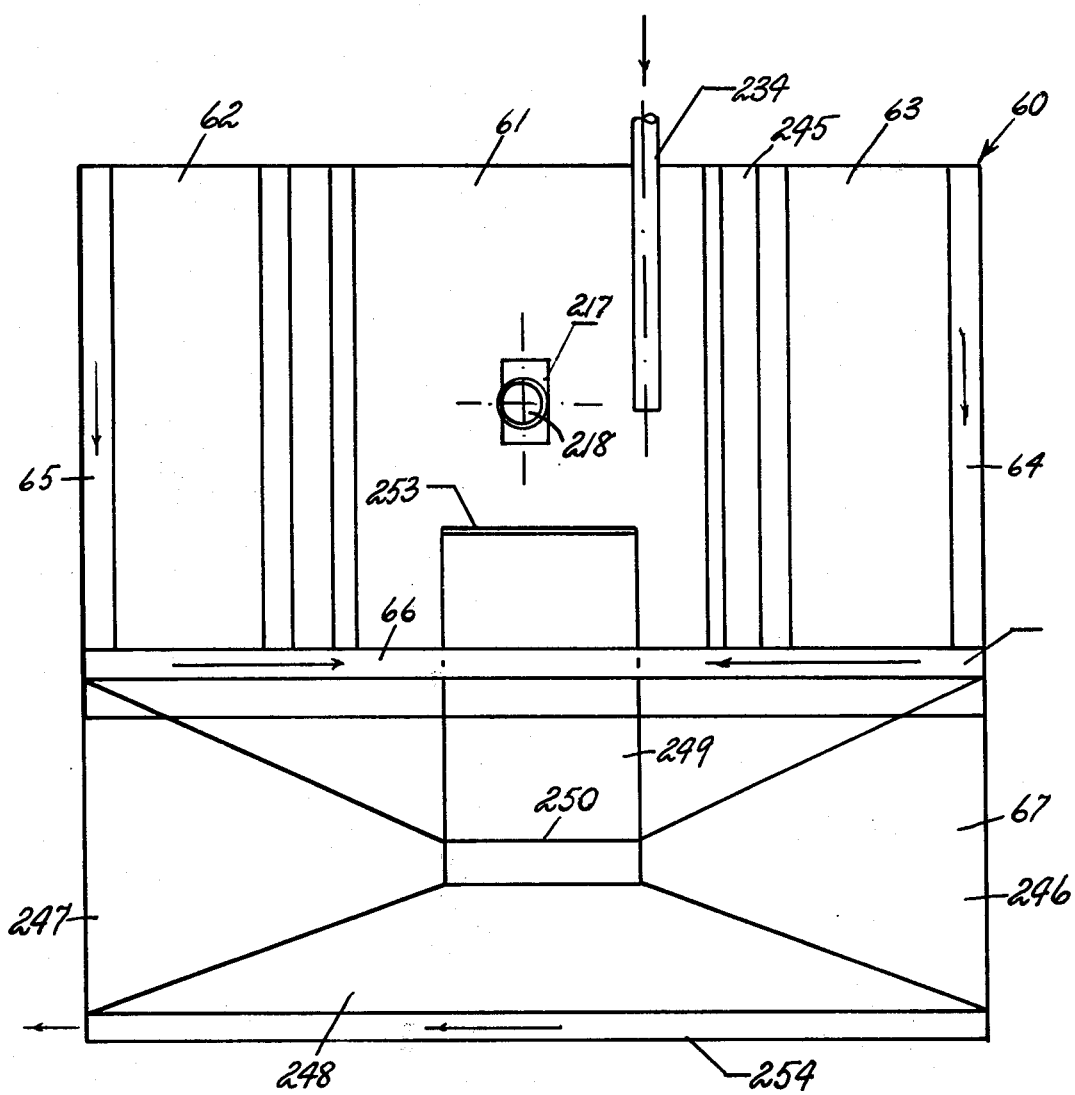
FIG. 5 is a schematic top plan view showing a third embodiment of the invention.
Figure 6:
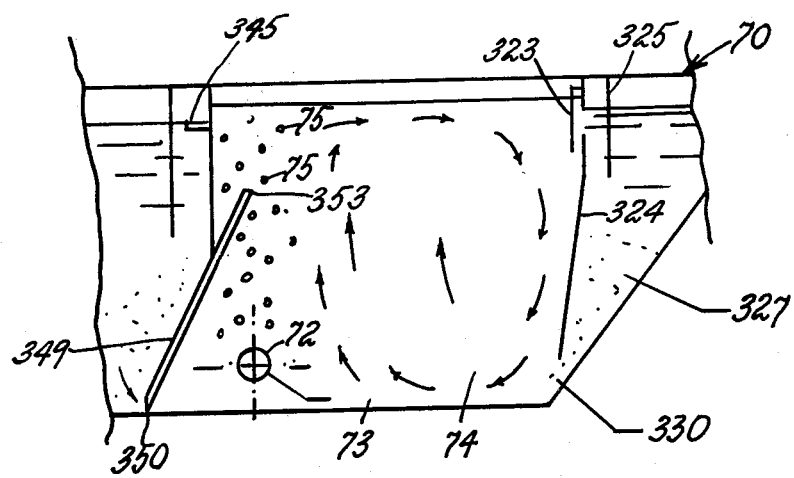
FIG. 6 is a schematic vertical sectional view showing a fourth embodiment of the invention.

The third embodiment, illustrated in FIG. 5 will be seen to be a combination of the features of the first and second embodiments, in that a pair of first step settling chambers are disposed on either side of the aerating chamber, this portion of the third embodiment functioning in exactly the same manner as the first embodiment. In addition, a second step settling chamber is provided which receives the effluent through troughs 64, 65 and 66 from the two first step parallel connected settling chambers. Effluent from the second step settling chamber 67 leaves the treatment unit at the top through a trough 254. A single impeller aerating device to recover sludge from each settling chamber back into aeration chamber 61 through two ports and one conduit 249 is used in this embodiment.

Thus, the third embodiment includes an aerating section 61, two first step settling chambers 62 and 63, respectively, drainage troughs 64, 65 and 66 interconnecting first step settling chambers with the second step settling chamber 67. First step settling chambers operate in tandem with the second step settling chambers.

In the fourth embodiment, generally indicated by reference character 70, parts corresponding to the second embodiment have been designated by similar reference characters with the additional prefix "3". The fourth embodiment differs from the second embodiment in the elimination of a mechanical impeller and the creation of turbulence entirely by the injection of relatively large size air bubbles at the bottom of the aerating chamber; except for the aerator, the fourth embodiment functioning in exactly the same manner as the second embodiment.

The fourth embodiment differs from the second embodiment in the elimination of a mechanical impeller, and the creation of turbulence entirely by the injection of relatively large size air bubbles at the bottom of the aerating section. It will be understood that this is accomplished by injecting the air at substantial pressure over atmospheric pressure. The large amount of air tends to rise to the surface of the aerating chamber at a very rapid rate, creating substantial turbulence to achieve the same mechanical effect as an impeller. The air intake indicated by reference character 72 is positioned at the lower end 73 of the aerating section 74. Large bubbies 75 rise in a generally vertical direction, but owing to the offset position of the air intake, a circuitous turbulence is created as indicated by the arrows in FIG. 6.

Circulation of waste water between the aeration chamber and the settling chambers is achieved by positioning the return inlets at locations of different pressure in the aeration chamber thereby permitting operation of the device without requiring any pumps in addition to the aerator.

I wish it to be understood that I do not consider the invention limited to the precise details of structure shown and set forth in this specification, for obvious modifications will occur to those skilled in the art to which the invention pertains.

I claim:

1. In a device for the biological treatment of waste water comprising a chamber for the aeration of said waste water and the exposure of said waste water to activated sludge, said aeration chamber having a horizontal sectional area which generally increases in size from a relatively smaller horizontal sectional area at the lower end thereof to a relatively larger horizontal sectional area at the upper end thereof, said aeration chamber having a waste water inlet in the lower area thereof so that the water moves generally from bottom to top of the aeration chamber, an aerator positioned in the lower part of said aeration chamber to aerate said waste water and cause said waste water to circulate in said aeration chamber, and a plurality of chambers for the settling of said sludge, at least one wall separating each of said settling chambers from said aeration chamber and said settling chambers positioned in approximately the same horizontal plane, and surrounding said aeration chamber, a passageway for waste water from the upper part of said aeration chamber to one of said settling chambers providing for a first step of the activated sludge settling and having the water level slightly lower than in the aeration chamber, trough means for conducting effluent from the first step settling chamber to another of said settling chambers providing a second step of sludge settling and having the water level slightly lower than in the first step sludge settling chamber, a conduit for sludge return from the second step sludge settling chamber to the aeration chamber, said conduit having a sludge inlet from the lower part of said second step settling chamber and a sludge outlet into said aeration chamber above said aerator in a zone of rising air bubbles emanating from said aerator, so that the pressure at said sludge outlet aspirates the sludge through the conduit without the use of pumps and is lower than at the port for sludge return from the first step sludge settling chamber, and a port in the lower part of the wall separating the first step settling chamber from the aeration chamber providing for the return of sludge from the said first step settling chamber to the aeration chamber, said port opening into said aeration chamber at a location which will be aspirated by said circulation of waste water, and the second step settling chamber having an outlet for removal of treated clarified waste water from the top thereof.

2. A device for the biological treatment of water comprising an aeration chamber for the aeration of said water and the exposure of said water to activated sludge, an aerator positioned in said aeration chamber, a waste water inlet in the lower part of said aeration chamber, a plurality of settling chambers, a first settling chamber providing a first step of sludge sedimentation, a second settling chamber providing a second step of sludge sedimentation, and a third settling chamber for a third step of sludge sedimentation; septum means for separating each of said settling chambers from the aeration chamber, a passageway communication between said aeration chamber and said first settling chamber, first trough means for conducting effluent from said first settling chamber to said second settling chamber, second trough means for conducting effluent from said second settling chamber to said third settling chamber, a first sludge return port from the first settling chamber into said aeration chamber, said first sludge return port opening into said aeration chamber at a location aspirated by said circulation of waste water, a conduit for sludge return from the second settling chamber into said aeration chamber, said first sludge return conduit opening into said aeration chamber at a location of lower pressure than the opening location of the first sludge return port, and a second conduit for sludge return from the third settling chamber into the aeration chamber, said second conduit opening into the aeration chamber at a zone of rising air bubbles above said aerator where the pressure is even less than at the openings for said port and said first conduit, said third settling chamber having an outlet for removal of treated clarified waste water, and said second and third chambers positioned approximately in the same horizontal plane; whereby settled sludge returns from the settling chambers to the aeration chamber without the use of pumps by the provision of suction effects at each sludge return opening, so as to effect either simultaneous operation in parallel of settling and sludge return from all settling chambers with the pressures at all sludge return openings into the aeration chamber being maintained equal; or so as to effect a step-by-step operation, with every sludge return opening into the aeration chamber in an area of less pressure, and therefore greater suction, than the sludge return opening from the previous step of sedimentation.

* * * * *